(12) United States Patent
Young et al.

(10) Patent No.: US 11,551,576 B2
(45) Date of Patent: Jan. 10, 2023

(54) BRAILLE REFERENCE CARD FOR REMOTE CONTROL

(71) Applicant: SONY GROUP CORPORATION, Tokyo (JP)

(72) Inventors: David Young, San Diego, CA (US); Hyehoon Yi, San Diego, CA (US); Yuko Sakamaki, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 17/210,782

(22) Filed: Mar. 24, 2021

(65) Prior Publication Data
US 2022/0309952 A1  Sep. 29, 2022

(51) Int. Cl.
*G09B 21/00* (2006.01)

(52) U.S. Cl.
CPC .................... *G09B 21/004* (2013.01)

(58) Field of Classification Search
CPC .................................................. G09B 21/004
See application file for complete search history.

(56) References Cited

U.S. PATENT DOCUMENTS 10,438,107 B1 * 10/2019 Gamboa ............... G06K 19/063
10,496,171 B2 * 12/2019 Bella .................... G09B 21/004
10,802,588 B2 * 10/2020 Martin ................. G09B 21/004
11,200,815 B2 * 12/2021 White .................. G09B 21/004
2011/0227853 A1    9/2011 Warungu
2019/0182371 A1 *  6/2019 Ashall ................... G06F 3/0488

FOREIGN PATENT DOCUMENTS

GB         2570471 A  *  7/2019  ........... G06F 1/1669
KR   10-1774707 B1      9/2017
KR   2019-0047431 A     5/2019

* cited by examiner

*Primary Examiner* — Vinh T Lam
(74) *Attorney, Agent, or Firm* — Chip Law Group

(57) ABSTRACT

A braille reference card for a remote control is provided. The braille reference card includes a base that includes a plurality of regions. Each region of the plurality of regions includes at least one of a surface projection or at least one braille embossed character set of a plurality of braille embossed character sets. A position of the surface projection corresponds to a position of a button on the remote control. The at least one braille embossed character set is one of adjacent to the surface projection or on the surface projection. The at least one braille embossed character set indicates a functionality of the button that corresponds to the position of the surface projection. A surface area of the base is larger than a surface area of the button layout of the remote control. The at least one region corresponds to a multi-function button on the remote control.

15 Claims, 10 Drawing Sheets

BRAILLE REFERENCE CARD FOR REMOTE CONTROL

CROSS-REFERENCE TO RELATED APPLICATIONS/INCORPORATION BY REFERENCE

None.

FIELD

Various embodiments of the disclosure relate to a braille reference card. More specifically, various embodiments of the disclosure relate to a braille reference card for a remote control.

BACKGROUND

Conventionally, a remote control of an electronic device (such as a television) may have several buttons. Each button on the remote control may have one or more functions associated therewith. A visually impaired person may face difficulty while operating the remote control, since a majority of the buttons on the remote control feel similar by touch. At best, the visually impaired person may remember one or two primary buttons (such as ON/OFF button), and may not be able to switch channels or control the volume of the television without the assistance of another person. In some cases, the remote control includes a braille character adjacent to the primary button (such as ON/OFF button). However, the visually impaired person may not be able to control the additional functions of the television without the assistance of another person. Manufacturers of the electronic device (such as the television) may not prefer to include braille characters for all the buttons on the remote control, because it makes the layout of the remote control very cluttered for the end user and increases the manufacturing cost.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A braille reference card for remote control is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
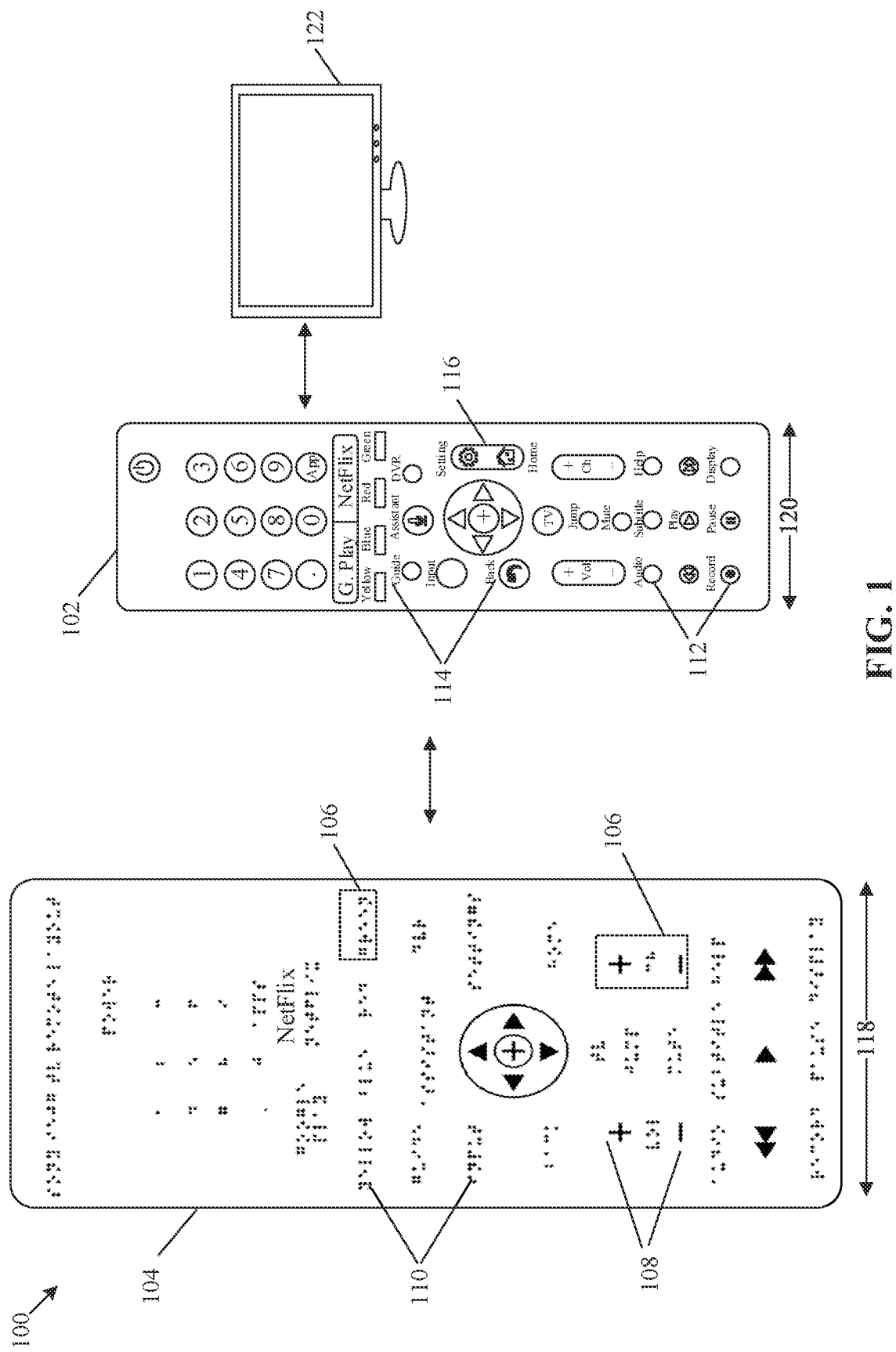
FIG. 1 is a diagram that illustrates an exemplary braille reference card for a remote control, in accordance with an embodiment of the disclosure.

The following described implementations may be found in the disclosed braille reference card for a remote control, the disclosed braille kit for a customized remote-control layout, and the disclosed system for generation of the braille reference card. Exemplary aspects of the disclosure provide a braille reference card for a remote control of an electronic device (such as a television). The braille reference card may include a base. The base may include a plurality of regions. Each region of the plurality of regions includes at least one of a surface projection or at least one braille embossed character set of a plurality of braille embossed character sets. In an example, the surface projection may be a dummy button that has an appearance similar to a button on the remote control. A position of the surface projection and the at least one braille embossed character set on the braille reference card may correspond to a position of the button on the remote control such that a layout of the braille reference card may correspond to a button layout of the remote control. In an embodiment, the at least one braille embossed character set may be one of adjacent to the surface projection or on the surface projection. The at least one braille embossed character set may indicate a functionality of the button on the remote control that corresponds to the position of the surface projection or the at least one braille embossed character set. In an embodiment, a surface area of the base may be larger than a surface area of the button layout of the remote control such that at least one region of the plurality of regions may accommodate at least two braille embossed character sets of the plurality of braille embossed character sets. The at least one region may correspond to a multi-function button (e.g. a button that has dual functions each associated with a long press and a short press) on the remote control.

Thus, the disclosed braille reference card may enable a user (such as a visually impaired person) to refer to the braille reference card and learn the functionality of each button on the remote control that corresponds to the position of the dummy button or the braille embossed character set on the braille reference card. The disclosed braille reference card thus enables the user to navigate through various buttons of the remote control and use multiple functionalities of the electronic device (such as the television) without assistance from another person. The disclosed braille reference card further enables the user to learn and utilize the multi-function button on the remote control. Furthermore, the manufacture of the electronic device may cater to the visually impaired people without increasing the manufacturing cost of the remote control, since the braille reference card is separate from the remote control and may be ordered separately along with the remote control based on need.

Exemplary aspects of the disclosure further provide a braille kit for a customized remote-control layout. The braille kit may comprise a first base sheet that comprises an adhesive release liner surface and a second base sheet that comprises an adhesive retaining surface. The braille kit may further comprise a plurality of braille embossed members corresponding to a plurality of buttons of a universal remote control. The plurality of braille embossed members may be releasably adhered to the adhesive release liner surface of the first base sheet. Each braille embossed member of the plurality of braille embossed members may comprise a brailed embossed character set that may indicate a function corresponding to a button of the universal remote control. Each of the plurality of braille embossed members may be transferable from the first base sheet to the second base sheet to generate the customized remote-control layout based on a button layout of the universal remote control. The customized remote-control layout may correspond to a subset of the plurality of buttons of the universal remote control. Thus, the disclosed braille kit may enable the user (such a visually impaired person) to generate a customized remote-control layout for an existing remote control (such as a universal remote control), such that the customized remote-control layout may include braille characters for a subset of the buttons on the universal remote control.

Exemplary aspects of the disclosure further provide a system to request generation of a braille reference card. The system may comprise a server that may be configured to generate a user interface to receive at least one user input. The user input may be indicative of at least one of a model number associated with an electronic device, a button layout of a remote control associated with the electronic device, or a custom layout having a subset of buttons of the button layout of the remote control. The server may further receive a request to generate a braille reference card that corresponds to one of the button layout of the remote control associated with the electronic device or the custom layout. The system may comprise a user device associated with a user of the electronic device. The user device comprises a display screen configured to display the user interface. Thus, the disclosed system may enable the user to custom order the braille reference card via the user interface based on the button layout of an existing remote control or the custom layout.

FIG. 1 is a diagram that illustrates an exemplary braille reference card for a remote control, in accordance with an embodiment of the disclosure. With reference to FIG. 1, there is shown a braille reference card 100 for a remote control 102 of an electronic device 122 (such as a television). The braille reference card 100 may include a base 104 that may include a plurality of regions 106. Each region 106 may include at least one of a surface projection 108 or at least one braille embossed character set 110. The remote control 102 may include a plurality of buttons 112.

In FIG. 1, the braille reference card 100 and the remote control 102 for a television are shown merely as example. The present disclosure may be also applicable to other types of the braille reference card 100, and other types of the remote control 102 for a variety of electronic or electrical devices (such as a digital media player, a digital console, a gaming console, an air conditioner, a heating, ventilation, and air conditioning (HVAC) system, a projector, etc.). A description of other types has been omitted from the disclosure for the sake of brevity.

The braille reference card 100 may include a material suitable for embossing the surface projections 108 and the braille character sets 110 thereon. The braille reference card 100 may provide a handy reference for a user (such as a visually impaired user) in order to navigate the layout of the remote control 102. The braille reference card 100 may be similar in shape to the remote control 102. The braille reference card 100 may include a base 104.

The remote control 102 may include suitable logic, circuitry, code, and/or interfaces to control one or more functionalities 114 of the electronic device 122 (such as the television) by transmission of control signals to the electronic device 122. The remote control 102 may include the plurality of buttons 112 associated with a plurality of functions 114 of the electronic device 122. The remote control 102 may include an infrared transmitter or a Bluetooth® interface to transmit the control signals to the electronic device 122 corresponding to the button 112 being pressed. The functions 114 that may be controlled using the remote control 102 may include, but are not limited to, a volume, a channel, playback, record, settings of the electronic device 122, input source selection, and a voice assistant, and so on. The plurality of buttons 112 of the remote control 102 may be associated with different set of functions (temperature or blower speed) based on the type of the electronic device 122 (such as an air conditioner) being controlled. In an embodiment, the remote control 102 may be manufactured and packaged by the manufacturer of the electronic device 122. In another embodiment, the remote control 102 may be a universal remote control that may include the plurality of buttons 112 that may be programmed to control one or more types of electronic devices. In an embodiment, the remote control may be powered by one or more batteries. As shown in FIG. 1, for example, the remote control 102 may comprise a multi-function button 116 that may have "settings" and "home" functionalities associated therewith. In such a scenario, at least one region 106 on the braille reference card 100 may accommodate at least two braille embossed character sets 110 at a position corresponding to the position of the multi-function button 116, as described, for example, in FIG. 3. Each of at least two braille embossed character sets 110 may be indicative of one of the functionalities of the multi-function button 116.

The base 104 may comprise a material including, for example, but not limited to, a cardboard, a paper laminate, a polymer (such as plastic), or a fiber mesh, any other rigid or flexible material. The base 104 may include a plurality of regions 106. Each region 106 may include at least one of the surface projection 108 or the at least one braille embossed character set 110. A position of the surface projection 108 and the at least one braille embossed character set 110 may correspond to a position of the button 112 on the remote control 102. As shown in the FIG. 1, for example, the braille embossed character set 110 may be adjacent to the surface projection 108. In some embodiments, a surface area (e.g. width×length) of the base 104 may be larger than a surface area of the button layout of the remote control 102, such that at least one region of the plurality of regions 106 may accommodate at least two braille embossed character sets of the plurality of braille embossed character sets 110. As shown in FIG. 1, the width 118 of the base 104 of the braille reference card 100 may be larger than the width 120 of the remote control 102, such that at least one region of the base 104 may correspond to a multi-function button 116 on the remote control 102, as described, for example, in FIG. 3.

Each region of the plurality of regions 106 of the base 104 may comprise the braille embossed character set at a position that may correspond to the position of a button on the remote control. In an embodiment, each region of the plurality of regions 106 may comprise a combination of the surface projection 108 and the braille embossed character set 110. For example, each region 106 may include a surface area of the base 104 that defines a virtual boundary between adjacent combinations of the surface projection 108 and the braille embossed character set 110. In another embodiment, each region of the plurality of regions 106 may comprise a combination of the surface projection 108, the braille embossed character set 110, and printed text that may indicate the functionality of the button 112 on the remote control 102 that corresponds to the position of the surface projection 108 and the braille embossed character set 110. The text may be printed adjacent to the surface projection 108 or adjacent to the braille embossed character set 110. As shown in FIG. 1, for example, the text "Netflix®" may be printed adjacent to the braille embossed character set 110, and may indicate of the functionality (such as one-press access to Netflix® service) of the button 112 on the remote control 102.

The surface projection 108 may be a dummy button having an appearance similar to the button 112 at the corresponding position on the remote control 102. The surface projection 108 may be similar in shape and dimension to the button 112 at the corresponding position on the remote control 102. In an embodiment, the surface projection 108 may be different in dimension to the button 112 at the corresponding position on the remote control 102. In an embodiment, the base 104 may include the surface projection 108 corresponding to each button of the plurality of buttons 112 of the remote control 102. In another embodiment, base 104 may include the surface projection 108 corresponding to a subset of buttons of the plurality of buttons 112 of the remote control 102. In another embodiment, the surface projection 108 may be embossed on the base 104 using an embosser by the manufacturer of the remote control 102. In another embodiment, the base 104 may be molded using a molding equipment to create the surface projection 108. In an embodiment, the surface projection 108 may be printed with indicia (such as +, −, ▲, ▼, ▶, ∥, ▶▶, or ◀◀) representing a functionality 114 of the button 112 (such as volume up, volume down, channel up, channel down, play, pause, fast forward, or rewind) of the remote control 102.

The braille embossed character set 110 may be printed on the base 104. In an embodiment, the braille embossed character set 110 may be printed on an adhesive member that is releasably adhered to the base 104 as described, for example, in FIG. 2. In an example, the position of the braille embossed character set 110 may correspond to a position of the respective button 112 on the remote control 102. In an embodiment, the braille embossed character set 110 may be one of adjacent to the surface projection 108 or on the surface projection 108. The braille embossed character set 110 may indicate a functionality 114 of the corresponding button 112 on the remote control 102. In an embodiment, the braille embossed character set 110 may be embossed on the base 104 using a braille embosser by the manufacturer of the remote control 102. The braille embosser may comprise an impact printer that may emboss each braille embossed character set 110 at controlled positions on the base 104 using braille translation software.

The electronic device 122 may include suitable logic, circuitry, and/or interfaces that may be configured to control reception of control signals from the remote control 102 for control of a functionality 114 of the electronic device 122. The electronic device 122 may include an infrared receiver or a Bluetooth® interface to receive control signals transmitted from the remote control 102 corresponding to the button 112 being pressed on the remote control 102. Examples of the electronic device 122 may include, but are not limited to, a television, a music system, a tablet computing device, a personal computer, a projector, a gaming console, a media player, or other consumer electronic device. For example, in case the electronic device 122 is a television or a digital media player, the functions that may be controlled by the remote control 102 include, but are not limited to, playback, fast forward, channel switching, sound and display settings of the electronic device 122, and so on. For example, in case the electronic device 122 is an air conditioner, the functions that may be controlled by the remote control 102 include, but are not limited to, temperature, blower speed, motion of vents, and so on.

In operation, the braille reference card 100 may be referenced by the user (such as a visually impaired person) to learn the function of the button 112 on the remote control 102, based on the functionality 114 indicated by the braille embossed character set 110 at the corresponding position on the braille reference card 100. The user may switch back and forth between the remote control 102 and the braille reference card 100 to reference the braille embossed character set 110 on the braille reference card 100 each time the user desires to control the functions 114 of the electronic device 122. Therefore, the braille reference card 100 may enable the user (such as a visually impaired person) to utilize the remote control 102 to control the functionalities 114 of the electronic device 122 without the assistance of another person.

Figure 2:
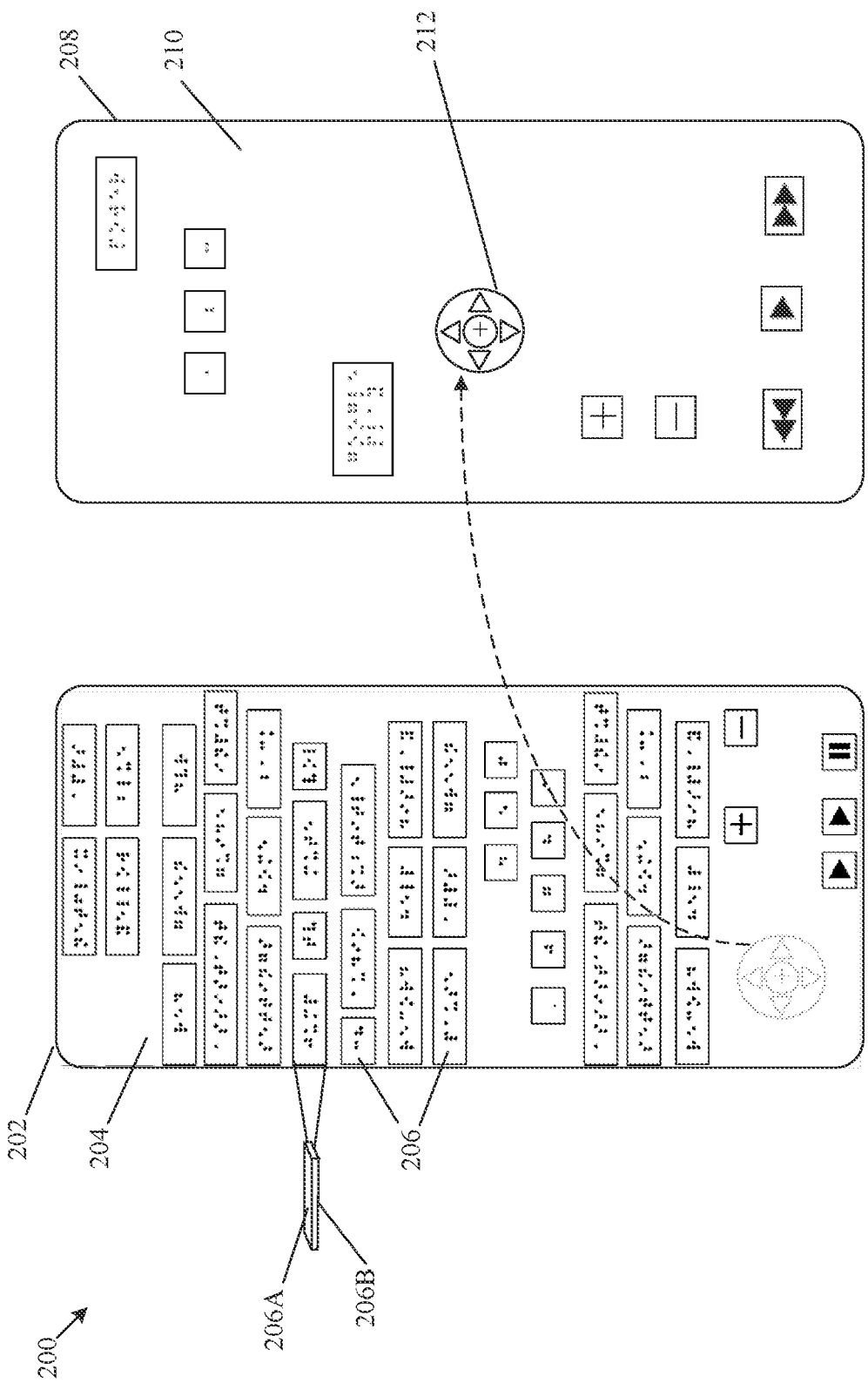
FIG. 2 is a diagram that illustrates an exemplary braille kit for a customized remote-control layout, in accordance with an embodiment of the disclosure.

FIG. 2 is a diagram that illustrates an exemplary braille kit for a customized remote-control layout, in accordance with an embodiment of the disclosure. FIG. 2 is explained in conjunction with elements from FIG. 1. With reference to FIG. 2, there is shown a braille kit 200 for a customized remote-control layout. The braille kit 200 may include a first base sheet 202 including an adhesive release liner surface 204. The braille kit 200 may further include a plurality of braille embossed members 206, a plurality of dummy button members 212, and a second base sheet 208 including an adhesive retaining surface 210.

The first base sheet 202 may comprise a material including, for example, but not limited to, a cardboard, a paper laminate, a polymer (such as plastic), a fiber mesh, or any other rigid or flexible material. The first base sheet 202 may serve as a carrier sheet for adhesive-carrying members (such as the plurality of braille embossed members 206). The first base sheet 202 may include an adhesive release liner surface 204 that may releasably adhere to the adhesive-carrying members (such as the plurality of braille embossed members 206). The adhesive release liner surface 204 may comprise a smooth surface texture that may not retain an adhesive material from the adhesive-carrying members (such as the plurality of braille embossed members 206) when the adhesive-carrying members are released from the first base sheet 202, such that the adhesive-carrying members may be re-adhered to another surface. In some embodiments, the adhesive release liner surface 204 may be coated with a release agent to prevent the adhesive-carrying members from premature adherence to the first base sheet 202. The adhesive release liner surface 204 may provide a release effect against the adhesive material of the adhesive-carrying members (such as the plurality of braille embossed members 206). Examples of the material of the first base sheet 202 may include, but are not limited to, glassine, an enamel paper, a polyester film, a polypropylene film, or a polyethylene film.

The plurality of braille embossed members 206 may correspond to a plurality of buttons of a universal remote control (such as the remote control 102). The plurality of braille embossed members 206 may be releasably adhered to the adhesive release liner surface 204 of the first base sheet 202. Each braille embossed member of the plurality of braille embossed members 206 may comprise a first surface 206A and a second surface 206B opposite to the first surface 206A. The first surface 206A may include a brailed embossed character set that may be indicative of a functionality 114 of a button 112 of the universal remote control (such as the remote control 102). The second surface 206B may include an adhesive material. Each of the plurality of braille embossed members 206 may be transferable from the first base sheet to the second base sheet to generate the customized remote-control layout based on a button layout of the universal remote control 102. The first surface 206A of each braille embossed member 206 may include a brailed embossed character set corresponding to one or more buttons of the plurality of buttons 112 (such as a volume control button, a channel switch button) of the universal remote control. The plurality of buttons 112 of the button layout of the universal remote control 102 may include, but are not limited to, a volume control button, a channel switch button, a display settings button, a "Source" button, and a "Home" button. Examples of the material of the plurality of braille embossed members 206 may include, but are not limited to, paper, a polymer (such as plastic), a fiber mesh, or any other rigid or flexible material. Examples of the adhesive material on the second surface 206B may include, but are not limited to, a natural resin (such as starch-based resin) or a synthetic resin (such as epoxy, polyurethane).

The second base sheet 208 may comprise a material including, for example, but not limited to, a cardboard, a paper laminate, a polymer (such as plastic), a fiber mesh, or any other rigid or flexible material. The second base sheet 208 may include an adhesive retaining surface 210 that may adhere to the adhesive-carrying members (such as the plurality of braille embossed members 206). The adhesive retaining surface 210 may comprise a coarse surface texture that may retain an adhesive material from the adhesive-carrying members (such as the plurality of braille embossed members 206) when the adhesive-carrying members are adhered to the second base sheet 208. In some embodiments, the adhesive retaining surface 210 may be coated with an adhesive promoting agent to enhance the adhesion of the adhesive-carrying members (such as the plurality of braille embossed members 206) on the second base sheet 208. Different methods that may be employed to adhere the plurality of braille embossed members 206 to the second base sheet 208 may include, but are not limited to, drying, pressure-sensitive adhesion, ultraviolet light curing, and so on. The plurality of braille embossed members 206 may be adhered to the adhesive retaining surface 210 of the second base sheet 208 to generate the customized remote-control layout. A position of each braille embossed member 206 adhered on the second base sheet 208 may correspond to a position of a respective button of the plurality of buttons 112 on the universal remote control 102.

The plurality of dummy button members 212 may be similar in appearance to the plurality of buttons 112 of the universal remote control 102. The plurality of dummy button members 212 having an adhesive surface. The plurality of dummy button members 212 may be releasably adhered to the adhesive release liner surface 204 of the first base sheet 202. Each of the plurality of dummy button members 212 may be transferable from the first base sheet 202 to the second base sheet 208 to generate the customized remote-control layout. The surface of each dummy button member 212 that is opposite to the adhesive surface may be printed with indicia (such as +, −, −, ▲, ▼, ▶, ‖, ▶▶, or ◀◀) representing the functionality 114 of a button 112 (such as volume up, volume down, channel up, channel down, play, pause, fast forward, or rewind) of the universal remote control 102. Examples of the material of the plurality of braille embossed members 206 may include, but are not limited to, paper, a polymer (such as plastic), a fiber mesh, or any other rigid or flexible material.

In operation, the user may transfer the one or more of the plurality of braille embossed members 206 and one or more of the plurality of dummy button members 212 that may be releasably adhered to the adhesive release liner surface 204 of the first base sheet 202 to the adhesive retaining surface 210 of the second base sheet 208. The user may choose which of the plurality of braille embossed members 206 and the plurality of dummy button members 212 to transfer from the first base sheet 202 to the second base sheet 208 based on the customized layout of choice. For example, the user may wish to use a subset of the buttons on the universal remote control (such as the remote control 102), and may transfer a first set of the plurality of braille embossed members 206 and a second set of the plurality of dummy button members 212 from the first base sheet 202 to the second base sheet 208 to create a customized layout limited to the subset of the buttons. The position of the first set of the plurality of braille embossed members 206 adhered to the second base sheet 208 may correspond to a position of a respective button of the plurality of buttons 112 on the universal remote control (such as the remote control 102). The position of the second set of the plurality of dummy button members 212 adhered to the second base sheet 208 may correspond to a position of a respective button of the plurality of buttons 112 on the universal remote control (such as the remote control 102). The customized remote-control layout may serve as the braille reference card 100 for the universal remote control (such as the remote control 102).

In an embodiment, a surface area of the second base sheet 208 may be larger than a surface area of the universal remote control (such as the remote control 102) such that at least one region of the second base sheet 208, that corresponds to a position of the button on the universal remote control, accommodates at least two braille embossed members 206. The at least one region that accommodates at least two braille embossed members 206 may correspond to a multi-function button 116 on the universal remote control 102, as described, for example, in FIG. 3.

Figure 3:
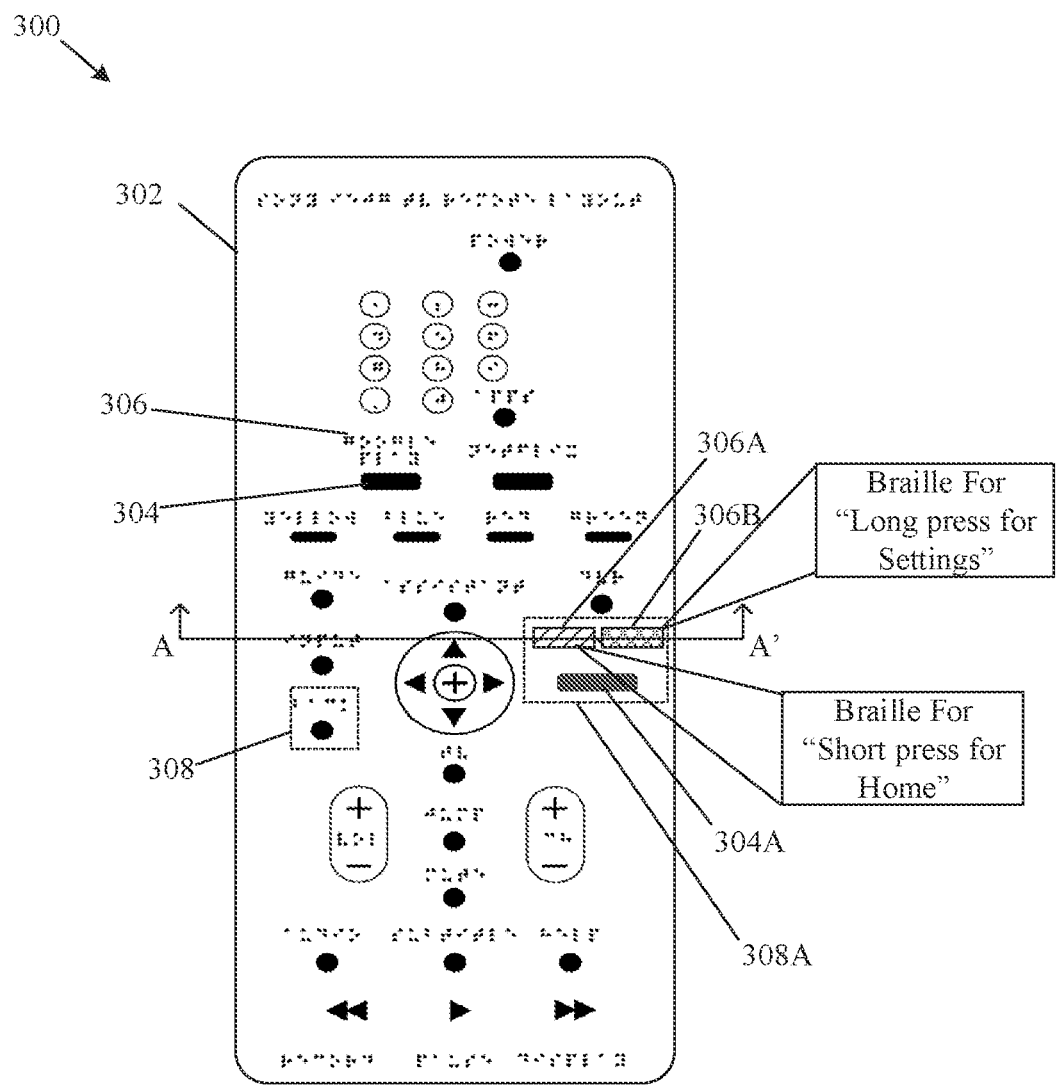
FIG. 3 is a diagram that illustrates an exemplary braille reference card for a remote control, in accordance with an embodiment of the disclosure.

FIG. 3 is a diagram that illustrates an exemplary braille reference card for a remote control, in accordance with an embodiment of the disclosure. FIG. 3 is explained in conjunction with elements from FIGS. 1, and 2. With reference to FIG. 3, there is shown a braille reference card 300 for a remote control (such as the remote control 102). The braille reference card 300 may include a base 302 that may include a plurality of regions 308. Each region 308 may include at least one of a surface projection 304 or at least one braille embossed character set 306. The braille reference card 300 may have a configuration and functionalities similar to the braille reference card 100. The base 302 may have a configuration and functionalities similar to the base 104. The surface projection 304 may have a configuration and functionalities similar to the surface projection 108. The braille embossed character set 306 may have a configuration and functionalities similar to the braille embossed character set 110. Accordingly, descriptions of the braille reference card 300 including the base 302, the surface projection 304, and the braille embossed character set 306 have been omitted from the disclosure for the sake of brevity.

As shown in FIG. 3, the braille reference card 300 may include a surface projection 304A that may correspond to a multi-function button 116 (such as a button that has dual functions each associated with a long press and a short press) of the remote control 102. The braille reference card 300 may further include a region 308A. The region 308A may include a first braille embossed character set 306A and a second braille embossed character set 306B adjacent to the surface projection 304A. The position of the surface projection 304A, the first braille embossed character set 306A, and the second braille embossed character set 306B on the braille reference card 300 may correspond to the position of the multi-function button 116 on the remote control 102.

The surface projection 304A within the region 308A may be a dummy button having an appearance similar to the multi-function button 116 at the corresponding position on the remote control 102. The surface projection 304A may be similar in shape and dimension to the multi-function button 116 of the remote control 102. In an embodiment, the surface projection 304A may be different in dimension and orientation to the multi-function button 116 of the remote control 102. In another embodiment, the surface projection 304A may be embossed on the base 302 using an embosser by the manufacturer of the remote control 102. In another embodiment, the base 302 may be molded using a molding equipment to create the surface projection 304A.

The first braille embossed character set 306A and the second braille embossed character set 306B may be printed on the base 302. In an embodiment, the first braille embossed character set 306A and the second braille embossed character set 306B may be printed on an adhesive member that is releasably adhered to the base 302 as described, for example, in FIG. 2. In an embodiment, the first braille embossed character set 306A and the second braille embossed character set 306B may be embossed on the base 302 using a braille embosser by the manufacturer of the remote control 102. The braille embosser may comprise an impact printer that may emboss each of the first braille embossed character set 306A and the second braille embossed character set 306B at controlled positions on the base 302 using braille translation software. The first braille embossed character set 306A may indicate the functionality 114 (such as "Home") of the multi-function button 116 when short pressed. The second braille embossed character set 306B may indicate the functionality 114 (such as "Settings") of the multi-function button 116 when long pressed. In an embodiment, the user (such as the visually impaired person) may distinguish the multi-function button 116 from other buttons 112 of the remote control by using the braille reference card 300, as described, for example, in FIG. 4.

Figure 4:
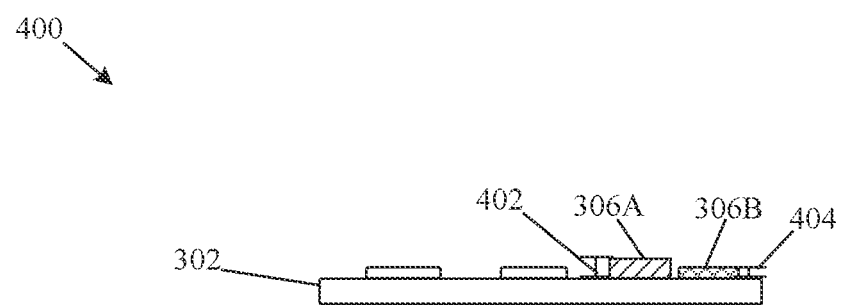
FIG. 4 is a diagram that illustrates a cross-sectional view of the braille reference card of FIG. 3 along axis A-A', in accordance with an embodiment of the disclosure.

FIG. 4 is a diagram that illustrates a cross-sectional view of the braille reference card of FIG. 3 along axis A-A', in accordance with an embodiment of the disclosure. FIG. 4 is explained in conjunction with elements from FIGS. 1, 2, and 3. With reference to FIG. 4, there is shown a cross-sectional view 400 of the braille reference card 300 along axis A-A'.

As shown in FIG. 4, the first braille embossed character set 306A and the second braille embossed character set 306B may be adjacent to the multi-function button 116 within the region 308A. In an embodiment, the first braille embossed character set 306A and the second braille embossed character set 306B may be disposed at different heights from the base 104. For example, the first braille embossed character set 306A may be disposed at a first height 402 from the base 104. The second braille embossed character set 306A may be disposed at a second height 404, different from the first height 402, from the base 104. Thus, the user (such as the visually impaired person) may easily differentiate between the button 112 having a single function and the multi-function button 116 of the remote control 102 based on the different heights of the first braille embossed character set 306A and the second braille embossed character set 306B on the braille reference card 300.

Figure 5:
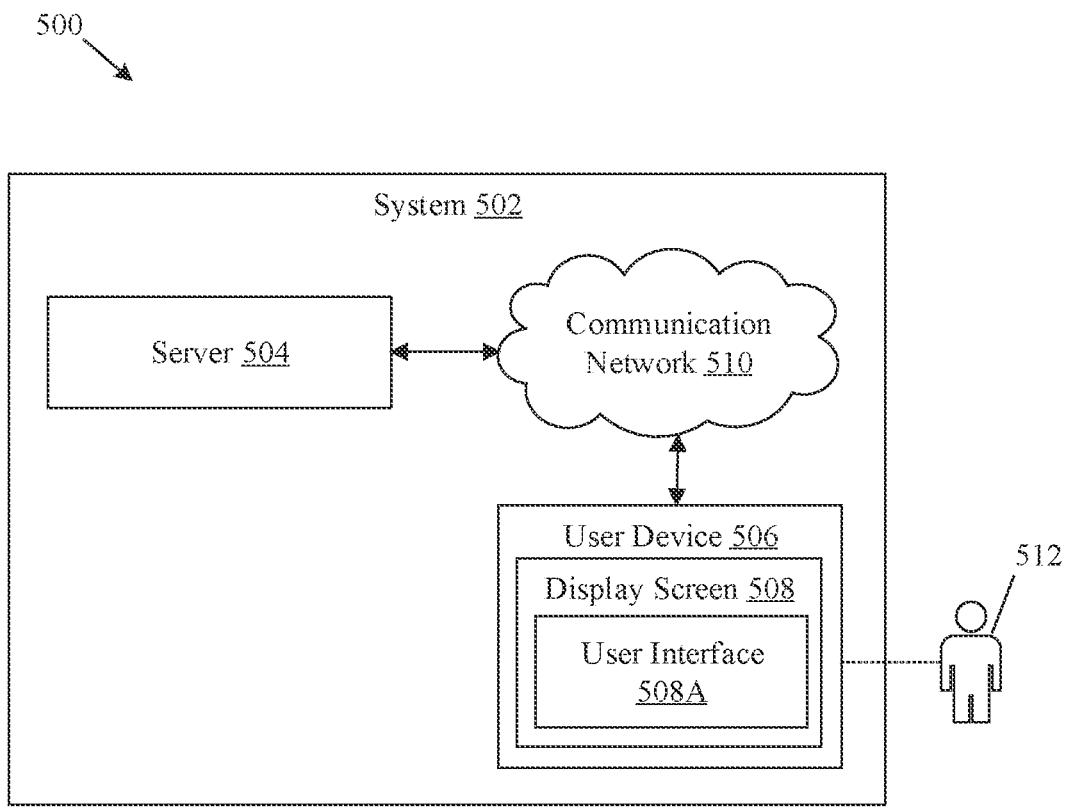
FIG. 5 is a block diagram that illustrates a network environment for generation of a braille reference card for a remote control, in accordance with an embodiment of the disclosure.

FIG. 5 is a block diagram that illustrates a network environment for generation of a braille reference card for a remote control, in accordance with an embodiment of the disclosure. FIG. 5 is explained in conjunction with elements from FIGS. 1, 2, 3, and 4. With reference to FIG. 5, there is shown a diagram of an environment 500. In the environment 500, there is shown a system 502. The system 502 comprises a server 504, a user device 506, and a communication network 510. The user device 506 may include a display screen 508. In the environment 500, there is further shown a user 512 associated with the user device 506.

The server 504 may include suitable logic, circuitry, code, and/or interfaces that may be configured to generate the user interface 508A to receive at least one user input. In some embodiments, the server 504 may be configured to receive a request to generate a braille reference card corresponding to one of a button layout of the remote control associated with the electronic device or a custom layout. The server 504 may be associated with one of a manufacturer or a distributor of the electronic device 122 and/or the remote control 102. The server 504 may execute operations through web applications, cloud applications, HTTP requests, repository operations, file transfer, and the like. Example implementations of the server 504 may include, but are not limited to, a database server, a file server, a web server, a media server, an application server, a mainframe server, or a cloud server.

The user device 506 may include suitable logic, circuitry, and/or interfaces that may be configured to control display of the generated user interface 508A. In an embodiment, the user device 506 may include a display screen 508 that may display the generated user interface 508A. In another embodiment, the user device 506 may remotely communicate with one or more display screens through the communication network 510. Examples of the user device 506 may include, but are not limited to, a mobile phone, a smart phone, a tablet computing device, a personal computer, a projector, a gaming console, a media player, or other consumer electronic device.

The display screen 508 may comprise suitable logic, circuitry, and interfaces that may be configured to render the user interface 508A. In some embodiments, the display screen 508 may be a touch screen which may enable a user 512 to provide a user input via the display screen 508. The touch screen may be at least one of a resistive touch screen, a capacitive touch screen, or a thermal touch screen. The display screen 508 may be realized through several known technologies such as, but not limited to, at least one of a Liquid Crystal Display (LCD) display, a Light Emitting Diode (LED) display, a plasma display, or an Organic LED (OLED) display technology, or other display devices. Examples of the display screen 508 may include, but are not limited to, an LED screen, an LCD screen, a display screen of a head mounted device (HMD), a smart-glass display, a see-through display, a projection-based display, an electrochromic display, or a transparent display.

The user interface 508A may correspond to a graphical user interface (GUI) rendered on the display screen 508 associated with the user device 506. The user interface 508A may be configured to display a form for input or selection of a model number associated with an electronic device, a button layout of a remote control associated with the electronic device, or a custom layout having a subset of buttons of the button layout of the remote control. The user interface 508A may include other graphical elements (such as graphical icons) that allow user interaction with a service associated with the server 504. In an embodiment, the user interface 508A may comprise a sequence of forms that may be generated in response to user interaction with each of the forms. Details of the user interface 508A are described, for example, in FIGS. 7A-7C, 8A, and 8B.

The communication network 510 may include a communication medium through which the server 504 and the user device 506 may communicate with each other. The communication network 510 may be one of a wired connection or a wireless connection Examples of the communication network 510 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 500 may be configured to connect to the communication network 510 in accordance with various wired and wireless communication protocols. Examples of such wired and wireless communication protocols may include, but are not limited to, at least one of $4^{th}$ Generation Long-Term Evolution (LTE), $5^{th}$ Generation New Radio (NR), a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 502 may be configured to generate the user interface 508A to receive at least one user input. The at least one user input is indicative of at least one of a model number associated with an electronic device 122 (such as a television), a button layout of the remote control 102 associated with the electronic device 122, or a custom layout having a subset of buttons of the button layout of the remote control 102. The system 502 may be configured to receive a request to generate the braille reference card 100 corresponding to one of the button layout of the remote control 102 associated with the electronic device 122 or the custom layout. Based on the received request, the manufacturer or the distributor of the electronic device 122 may manufacture or assemble the braille reference card 100 and make the braille reference card 100 available for delivery to or collection by the end user (such as the user 512). Details of the generated braille reference card 100 is described for example, in FIGS. 1,2, 3, and 4, and is omitted herein for the sake of brevity. Details of the user interface 508A for the generation of the braille reference card 100 is described for example, in FIGS. 7A, 7B, 7C, 8A, and 8B.

Figure 6:
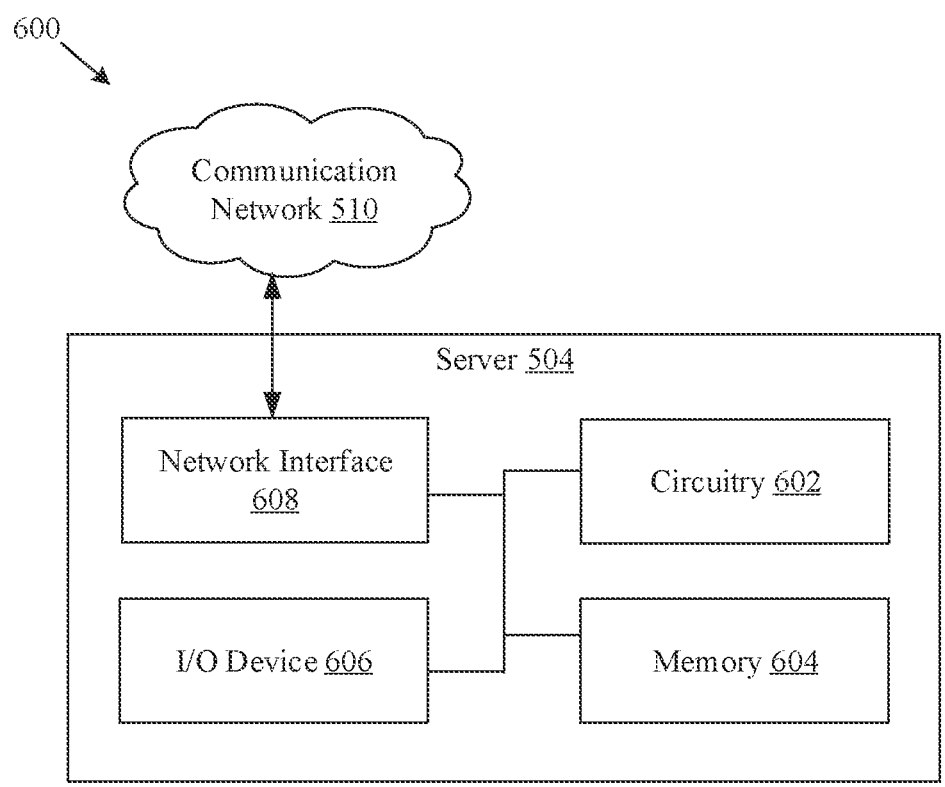
FIG. 6 is a block diagram that illustrates an exemplary server for generation of a braille reference card for a remote control, in accordance with an embodiment of the disclosure.

FIG. 6 is a block diagram that illustrates an exemplary server for generation of a braille reference card for a remote control, in accordance with an embodiment of the disclosure. FIG. 6 is explained in conjunction with elements from FIGS. 1, 2, 3, 4 and 5. With reference to FIG. 6, there is shown a block diagram 600 of the server 504. The server 504 may include circuitry 602, and a memory 604. In some embodiments, the server 504 may include a network interface 608 and an input/output (I/O) device 606.

The circuitry 602 may include suitable logic, circuitry, interfaces, and/or code that may be configured to execute program instructions associated with different operations to be executed by the server 504. For example, the circuitry 602 may generate a user interface to receive at least one user input. The user input may be indicative of at least one of a model number associated with an electronic device (such as the electronic device 122), a button layout of a remote control (such as the remote control 102) associated with the electronic device 122, or a custom layout having a subset of buttons of the button layout of the remote control 102. The circuitry 602 may receive a request to generate a braille reference card corresponding to one of the button layout of the remote control 102 associated with the electronic device 122 or the custom layout. The circuitry 602 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 602 may be implemented based on a number of processor technologies known in the art. Examples of implementations of the circuitry 602 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 604 may include suitable logic, circuitry, interfaces, and/or code that may be configured to store the program instructions to be executed by the circuitry 602. In some embodiments, the memory 604 may be configured to store a model number associated with the electronic device 122, a button layout of the remote control 102 associated with the electronic device 122, or a custom layout having a subset of buttons of the button layout of the remote control 102. In some embodiments, the memory 604 may be further configured to store a user profile (such as user details, user preferences, history of user transactions with the server 504, etc.) associated with the user 512. Examples of implementation of the memory 604 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 606 may comprise suitable logic, circuitry, interfaces, and/or code that may be configured to receive an input and provide an output based on the received input. The I/O device 606 may include various input and output devices, which may be configured to communicate with the circuitry 602. For example, the server 504 may receive user input from, for example, an administrator of the server 504 for maintenance and upgrade operations of the server 504.

Examples of the I/O device 606 may include, but are not limited to, a touch screen, a keyboard, a mouse, a joystick, a display device, a microphone, or a speaker.

The network interface 608 may include suitable logic, circuitry, interfaces, and/or code that may be configured to facilitate communication of the server 504 via the communication network 510. The network interface 608 may be implemented by use of various known technologies to support wired or wireless communication of the server 504 with the communication network 510. The network interface 608 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 608 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 4G LTE, 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX).

A person of ordinary skill in the art will understand that the server 504 in FIG. 6 may include other suitable components or systems, in addition to the components or systems which are illustrated herein to describe and explain the function and operation of the present disclosure. A detailed description for the other components or systems of the server 504 has been omitted from the disclosure for the sake of brevity. Operations of the server 504 are further described, for example, in FIGS. 7A-7C, 8A, and 8B.

Figure 7A:
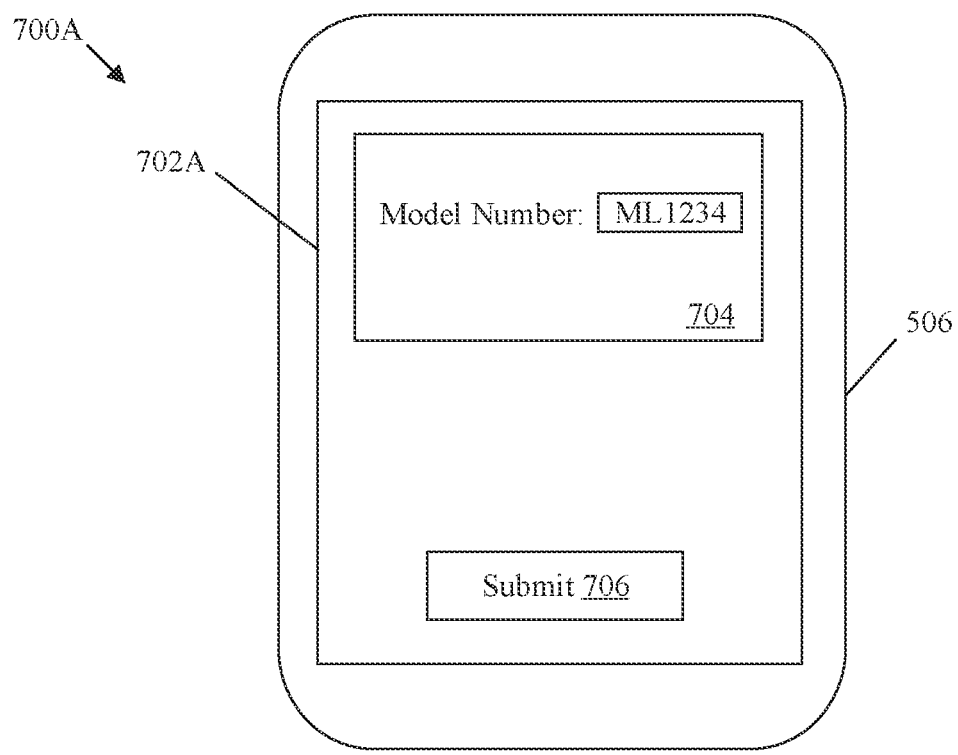
FIGS. 7A-7C are diagrams that collectively illustrate an exemplary scenario of a user interface to request generation of a braille reference card for a remote control, in accordance with an embodiment of the disclosure.

FIG. 7A is a diagram that illustrates an exemplary scenario of a user interface to request generation of a braille reference card for a remote control, in accordance with an embodiment of the disclosure. FIG. 7A is explained in conjunction with elements from FIGS. 1, 2, 3, 4, 5, and 6. With reference to FIG. 7A, there is shown a scenario 700A.

In the scenario 700A, there is shown a user interface (UI) 702A that may be generated by the server 504 and rendered on the user device 506. The UI 702A may receive at least one user input indicative of at least one of a model number associated with an electronic device, a button layout of a remote control associated with the electronic device, or a custom layout having a subset of buttons of the button layout of the remote control. As shown in FIG. 7A, the UI 702A may include a first UI element 704 and a second UI element 706. The first UI element 704 may correspond to a text entry box. The first UI element 704 may be configured to receive the user input indicative of the model number associated with the electronic device 122. For example, the first UI element 704 may receive the model number 'ML1234' as the user input. The second UI element 706 may correspond to, for example, a "Submit" button that may be clicked to accept the user input (such as the model number of the electronic device 122) for generation of the braille reference card 100 corresponding to the remote control 102, based on the received user input. In an embodiment, once the "Submit" button is clicked, the input model number may be transmitted from the user device 506 to the server 504 for further validation and processing at the server 504.

Figure 7B:
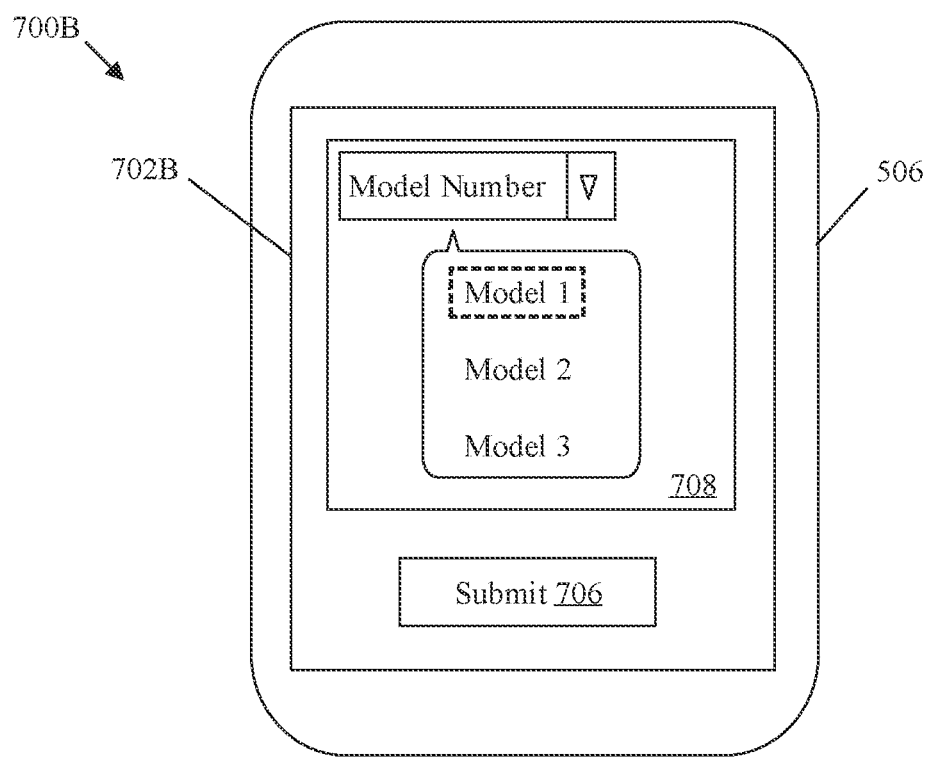

FIG. 7B is a diagram that illustrates an exemplary scenario of a user interface to request generation of a braille reference card for a remote control, in accordance with an embodiment of the disclosure. FIG. 7B is explained in conjunction with elements from FIGS. 1, 2, 3, 4, 5, 6, and 7A. With reference to FIG. 7B, there is shown a scenario 700B. In the scenario 700B, there is shown a user interface (UI) 702B that may be generated by the server 504 and rendered on the user device 506. In an embodiment, the UI 702B may include a dropdown menu to select a model number associated with the electronic device 122 as the user input. As shown in FIG. 7B, the UI 702B may include a third UI element 708 that may correspond to the dropdown menu. The third UI element 708 may be configured to receive the user input indicative of the selection of the model number from a plurality of model numbers (such as "Model 1", "Model 2", "Model 3"). For example, the third UI element 708 may display the model numbers "Model 1", "Model 2", "Model 3", and so on in the dropdown menu. The third UI element 708 may be scrolled to display other model numbers for user selection. The user selection of the model number from the dropdown menu may be indicated by a dashed rectangular box. The second UI element 706 (for example, the Submit" button) may be clicked to accept the user input (such as the selection of the model number of the electronic device 122) for generation of the braille reference card 100 corresponding to the remote control 102, based on the received user input. In an embodiment, once the "Submit" button is clicked, the selected model number may be transmitted from the user device 506 to the server 504 for further validation and processing at the server 504.

Figure 7C:
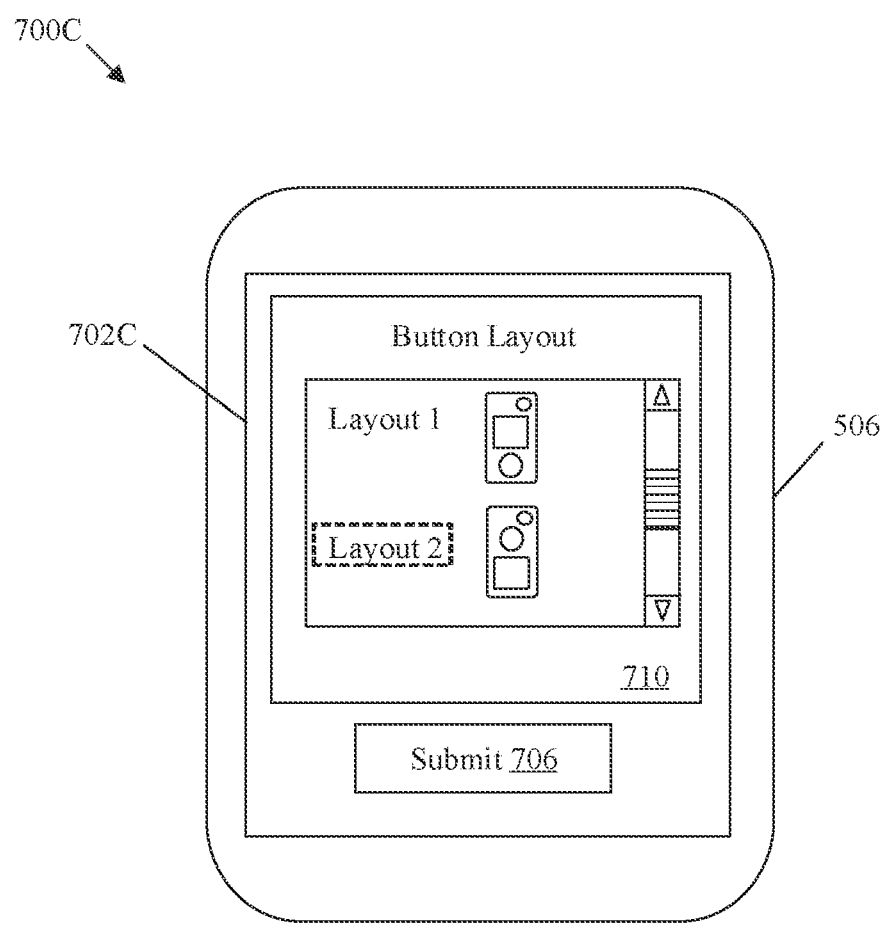

FIG. 7C is a diagram that illustrates an exemplary scenario of a user interface to request generation of a braille reference card for a remote control, in accordance with an embodiment of the disclosure. FIG. 7C is explained in conjunction with elements from FIGS. 1, 2, 3, 4, 5, 6, 7A, and 7B. With reference to FIG. 7C, there is shown a scenario 700C. In the scenario 700C, there is shown a user interface (UI) 702C that may be generated by the server 504 and rendered on the user device 506. As shown in FIG. 7C, the UI 702C may include a fourth UI element 710 that may correspond to the list box. The fourth UI element 710 may be configured to receive the user input indicative of the button layout of the remote control 102 from a plurality of button layouts. For example, the fourth UI element 710 may display the button layouts (such as "layout 1", "layout 2", and so on) along with images of the corresponding button layouts for user selection. The fourth UI element 710 may be scrolled to display other button layouts for user selection. The user selection of the button layout from the list box may be indicated by a dashed rectangular box. The second UI element 706 (for example, the Submit" button) may be clicked to accept the user input (such as the selection of the button layout) for generation of the braille reference card 100 corresponding to the remote control 102, based on the received user input. In an embodiment, once the "Submit" button is clicked, the selected button layout may be transmitted from the user device 506 to the server 504 for further validation and processing at the server 504.

Figure 8A:
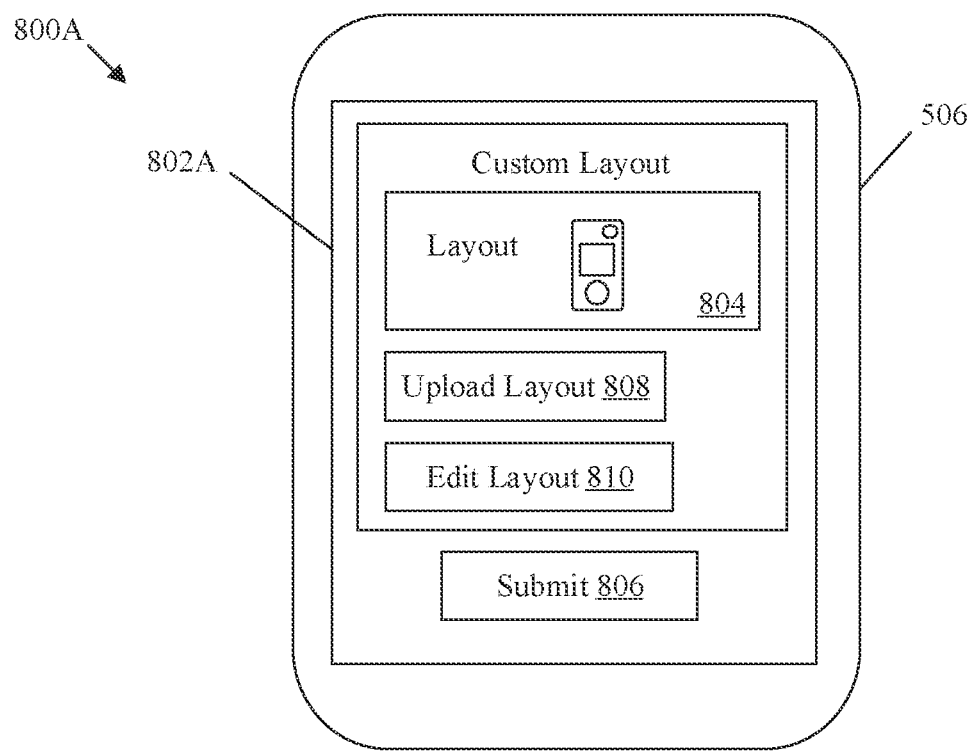
FIGS. 8A and 8B are diagrams collectively illustrates an exemplary scenario of a user interface to request generation of a braille reference card for a customized remote-control layout, in accordance with an embodiment of the disclosure.

FIG. 8A illustrates an exemplary scenario of a user interface to request generation of a braille reference card for a customized remote-control layout, in accordance with an embodiment of the disclosure. FIG. 8A is explained in conjunction with elements from FIGS. 1, 2, 3, 4, 5, 6, 7A, 7B, and 7C. With reference to FIG. 8A, there is shown a scenario 800A. In the scenario 800A, there is shown a user interface (UI) 802A that may be generated by the server 504 and rendered on the user device 506.

As shown in FIG. 8A, the UI 802A may include a first UI element 804 and a second UI element 806. In the scenario 800A, the at least one user input is indicative of a custom layout including an image of the button layout of the remote control 102. For example, the first UI element 804 may be configured to display the custom layout of the remote control 102 uploaded, for example, from a memory of the user device 506. The UI 802A may include a third UI element 808 that may correspond to a button (such as "Upload Layout" button) configured to upload an image of a custom layout corresponding to the remote control 102 from the memory of the user device 506. For example, the image of custom layout may be an image of an existing remote control 102 captured by the user device 506.

In an embodiment, the user interface (UI) 802A may include a user interface element to edit (such as add, remove, or move one or more buttons in the image of the button layout) the uploaded image of the button layout. As shown in FIG. 8A, UI 802A may include a fourth UI element 810 that may correspond to an "Edit Layout" button configured to open an image editor to edit (such as add buttons, remove buttons, or move one or more buttons in the image of the button layout) the uploaded image of the button layout. Based on the edited image of the button layout, the second UI element 806 (for example, the Submit" button) may be clicked to accept the user input (such as the uploaded image or the edited image of the button layout) and switch to a user interface (UI) 802B, as shown in FIG. 8B.

Figure 8B:
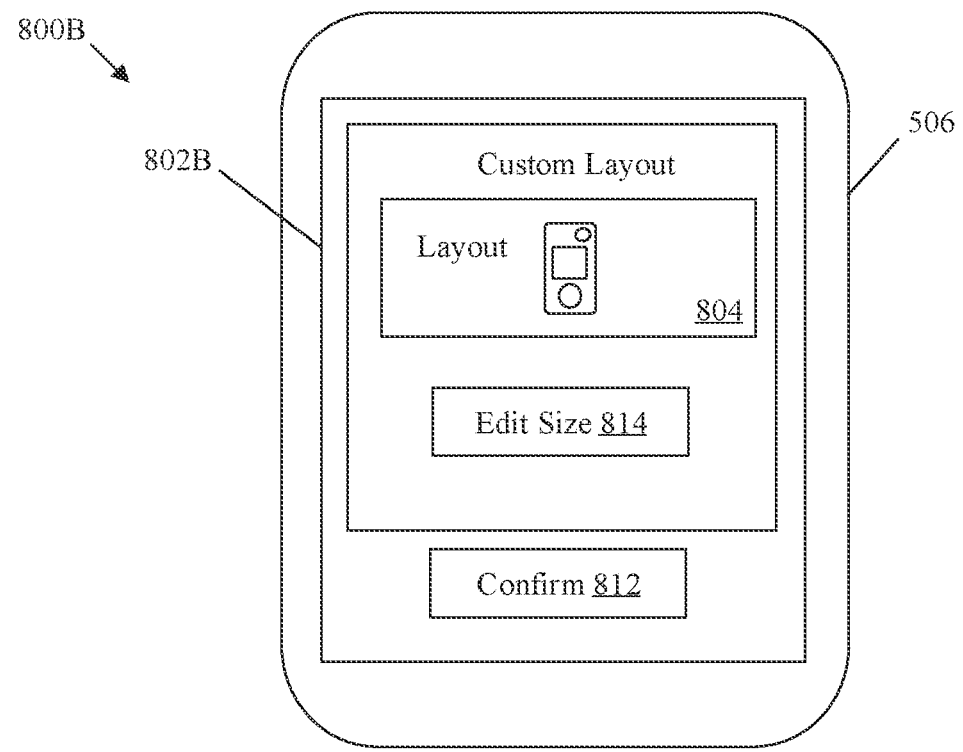

FIG. 8B illustrates an exemplary scenario of a user interface to request generation of a braille reference card for a customized remote-control layout, in accordance with an embodiment of the disclosure. FIG. 8B is explained in conjunction with elements from FIGS. 1, 2, 3, 4, 5, 6, 7A, 7B, 7C, and 8A. With reference to FIG. 8B, there is shown a scenario 800B. In the scenario 800B, there is shown a user interface (UI) 802B that may be generated by the server 504 and rendered on the user device 506.

As shown in FIG. 8B, the UI 802B may include the first UI element 804, a fifth UI element 812, and a sixth UI element 814. In an embodiment, the at least one user input indicates whether a surface area of the base 104 of the braille reference card may be larger than a surface area of the remote control 102. As shown in FIG. 8B, the sixth UI element 814 may correspond to an "Edit Size" button that allows edit of the size (such as surface area) of the base 104 of the braille reference card 100, such that surface area of the base 104 of the braille reference card may be larger than the surface area of the remote control 102. The fifth UI element 812 may correspond to a button (such as a "Confirm" button) configured to accept the user input for generation of the braille reference card 100 corresponding to the remote control 102. In an embodiment, the step of editing the size of the braille reference card 100 may be skipped. In an embodiment, once the "Confirm" button is clicked, the uploaded image or the edited image may be transmitted from the user device 506 to the server 504 for further validation and processing at the server 504.

Figure 9:
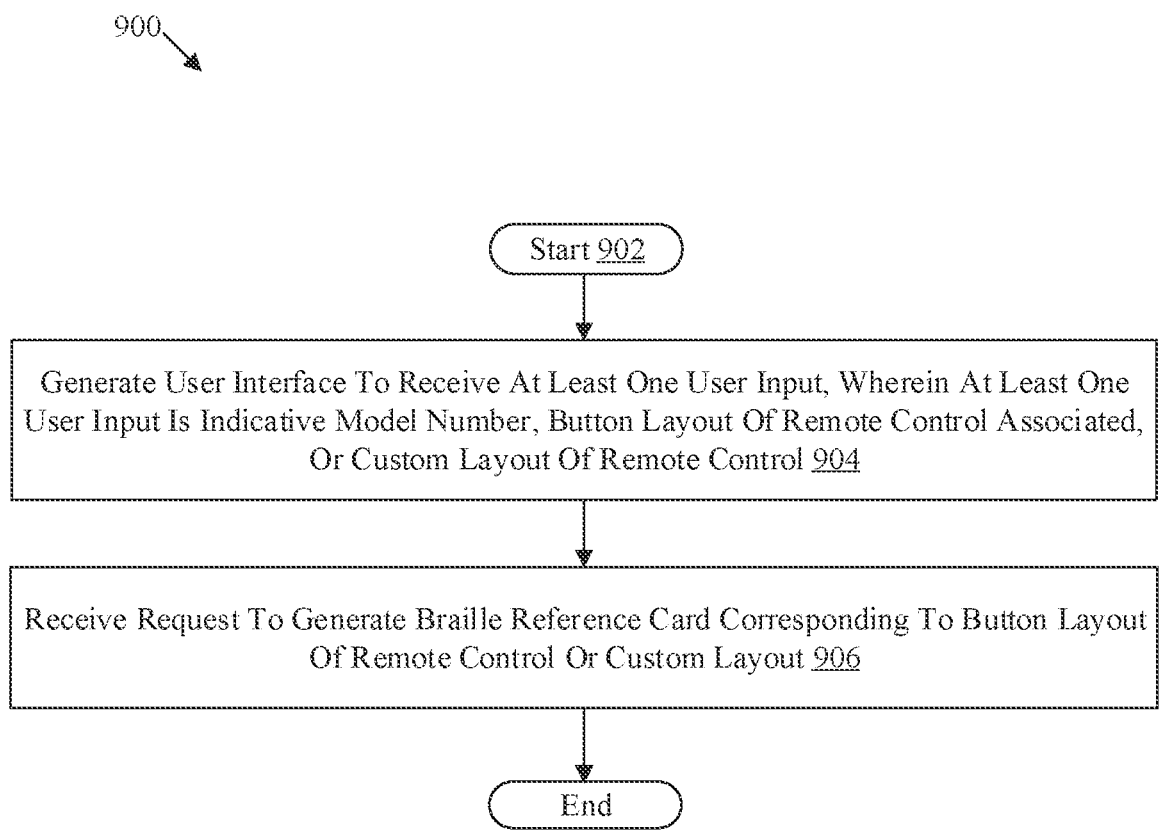
FIG. 9 is a flowchart that illustrates an exemplary method for generation of a braille reference card for a remote control, in accordance with an embodiment of the disclosure.

FIG. 9 is a flowchart that illustrates an exemplary method for generation of a braille reference card for a remote control, in accordance with an embodiment of the disclosure. FIG. 9 is explained in conjunction with elements from FIGS. 1, 2, 3, 4, 5, 6, 7A, 7B, 7C, 8A, and 8B. With reference to FIG. 9, there is shown a flowchart 900. The operations of the flowchart 900 may be executed by a computing system, such as the system 502 of FIG. 5. The operations may start at 902 and proceed to 904.

At 904, a user interface (such as the user interface 508A) may be generated. In one or more embodiments, the server 504 may be configured to generate the user interface (UI) 702A to receive at least one user input. The at least one user input may be indicative of at least one of a model number associated with an electronic device 122, a button layout of a remote control 102 associated with the electronic device 122, or a custom layout having a subset of buttons of the button layout of the remote control 102, as described for example, in FIGS. 7A, 7B, 7C, 8A, and 8B.

At 906, a request to generate a braille reference card (such as the braille reference card 100) may be received. In one or more embodiments, the server 504 may be configured to receive, from a user device 506, a request to generate the braille reference card 100 corresponding to one of the button layout of the remote control 102 associated with the electronic device 122 or the custom layout, as described, for example, in FIGS. 7A, 7B, and 7C. Control may pass to end.

Although the flowchart 900 is illustrated as discrete operations, such as 902, 904, and 906, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example the system 502 or the circuitry 602). The instructions may cause the machine and/or computer (for example the system 502 or the circuitry 602) to perform operations that may include generation of a user interface (such as the user interface 508A) to receive at least one user input. The at least one user input may be indicative of at least one of a model number associated with an electronic device (such as the electronic device 122), a button layout of a remote control (such as the remote control 102) associated with the electronic device 122, or a custom layout having a subset of buttons of the button layout of the remote control 102. The operations may further include reception of a request to generate a braille reference card (such as the braille reference card 100) corresponding to one of the button layout of the remote control 102 associated with the electronic device 122 or the custom layout. The user device 506 may include a display screen (such as the display screen 508) configured to display the user interface 508A.

Exemplary aspects of the disclosure include a braille reference card (such as the braille reference card 100) for a remote control (such as the remote control 102) of an electronic device (such as the electronic device 122). The braille reference card 100 may include a base (such as the base 104). The base 104 may include a plurality of regions (such as the regions 106). Each region of the plurality of regions 106 includes at least one of a surface projection (such as the surface projection 108) or at least one braille embossed character set (such as the embossed character set 110) of a plurality of braille embossed character sets. In an example, the surface projection 108 may be a dummy button that has an appearance similar to a button (such as the button 112) on the remote control 102. A position of the surface projection 108 and the at least one braille embossed character set 110 may correspond to a position of the button 112 on the remote control 102 such that a layout of the braille reference card 100 may correspond to a button layout of the remote control 102. In an embodiment, the at least one braille embossed character set 110 may be one of adjacent to the surface projection 108 or on the surface projection 108. The at least one braille embossed character set 110 may indicate a functionality (such as the functionality 114) of the button 112 on the remote control 102 that corresponds to the position of the surface projection 108. In an embodiment, a surface area of the base 104 may be larger than a surface area of the button layout of the remote control 102 such that at least one region (such as the region 308A) of the plurality of regions may accommodate at least two braille embossed character sets (such as the first braille embossed character set 306A and the second braille embossed character set 306B) of the plurality of braille embossed character sets. The at least one region may correspond to a multi-function button (such as the multi-function button 116) on the remote control 102.

In accordance with an embodiment, the surface projection 108 may be a dummy button having an appearance similar to the button 112 on the remote control 102.

In accordance with an embodiment, the at least one braille embossed character set 110 may be printed on an adhesive member (such as the braille embossed members 206) that is releasably adhered to the base (such as the first base sheet 202) adjacent to the surface projection 108 or on the surface projection 108.

In accordance with an embodiment, the at least one braille embossed character set 110 may be printed on the base 104 adjacent to the surface projection 108 or on the surface projection 108.

In accordance with an embodiment, the at least two braille embossed character sets in the at least one region comprises a first braille embossed character set (such as the first braille embossed character set 306A) and a second braille embossed character set (such as the second braille embossed character set 306B). The first braille embossed character set 306A may be disposed at a first height from the base 302 different from a second height of the second braille embossed character set 306B from the base 302.

In accordance with an embodiment, each region of the plurality of regions comprises text adjacent to the surface projection 108. The text may indicate the functionality (such as the functionality 114) of the button 112 on the remote control 102 that corresponds to the position of the surface projection 108.

Exemplary aspects of the disclosure further include a braille kit (such as the braille kit 200) for a customized remote-control layout. The braille kit 200 may comprise a first base sheet (such as the first base sheet 202) that comprises an adhesive release liner surface (such as the adhesive release liner surface 204) and a second base sheet (such as the second base sheet 208) that comprises an adhesive retaining surface (such as the adhesive retaining surface 210). The braille kit 200 may further comprise a plurality of braille embossed members (such as the plurality of braille embossed members 206) corresponding to a plurality of buttons (such as the buttons 112) of a universal remote control (such as the remote control 102). The plurality of braille embossed members 206 may be releasably adhered to the adhesive release liner surface 204 of the first base sheet 202. Each braille embossed member of the plurality of braille embossed members 206 may comprise a brailed embossed character set that may indicate a function corresponding to a button 112 of the universal remote control 102. Each of the plurality of braille embossed members 206 may be transferable from the first base sheet 202 to the second base sheet 208 to generate the customized remote-control layout based on a button layout of the universal remote control 102. The customized remote-control layout may correspond to a subset of the plurality of buttons 112 of the universal remote control 102.

In accordance with an embodiment, the plurality of braille embossed members 206 may be adhered to the adhesive retaining surface 210 of the second base sheet 208 to generate the customized remote-control layout. A position of each braille embossed member of the plurality of braille embossed members 206 adhered on the second base sheet 208 corresponds to a position of a respective button of the plurality of buttons 112 on the universal remote control 102. The customized remote-control layout may serve as a braille reference card 100 for the universal remote control 102.

In accordance with an embodiment, the braille kit 200 further comprises a plurality of dummy button members (such as the plurality of dummy button members 212) having an adhesive surface. The plurality of dummy button members 212 may be similar in appearance to the plurality of buttons 112 of the universal remote control 102. The plurality of dummy button members 212 may be releasably adhered to the adhesive release liner surface 204 of the first base sheet 202. Each of the plurality of dummy button members 212 may be transferable from the first base sheet 202 to the second base sheet 208 to generate the customized remote-control layout.

Exemplary aspects of the disclosure may include a system (such as the system 502) that may include a server (such as the server 504), a user device (such as the user device 506) associated with a user (such as the user 512) of an electronic device (such as the electronic device 122). The server 504 may be configured to generate a user interface (such as the user interface 508A) to receive at least one user input. The at least one user input is indicative of at least one of a model number associated with the electronic device 122, a button layout of a remote control (such as the remote control 102) associated with the electronic device 122, or a custom layout having a subset of buttons of the button layout of the remote control 102. The server 504 may be configured to receive a request to generate a braille reference card (such as the braille reference card 100) corresponding to one of the button layout of the remote control 102 associated with the electronic device 122 or the custom layout. The user device 506 may include a display screen (such as the display screen 508) configured to display the user interface 508A.

In accordance with an embodiment, the at least one user input that be may indicative of one of the button layout or the custom layout comprises an image of the button layout of the remote control 102. The user interface 508A may include a user interface element (such as the fourth UI element 810) to edit the image of the button layout to one of add or remove one or more buttons in the image of the button layout.

In accordance with an embodiment, the user interface (such as the user interface (UI) 702B) may include a dropdown menu (such as the third UI element 708) to select the model number associated with the electronic device 122 as the user input.

In accordance with an embodiment, the at least one user input indicates whether a surface area of the base 104 may be larger than a surface area of the remote control 102 associated with the electronic device 122.

In accordance with an embodiment, the server 504 may be associated with one of a manufacturer or a distributor of the electronic device 122.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A braille reference card for a remote control, the braille reference card comprising:
    a base that includes a plurality of regions, wherein
        each region of the plurality of regions includes at least one of a surface projection or at least one braille embossed character set of a plurality of braille embossed character sets,
        a position of the surface projection corresponds to a position of a button on the remote control such that a layout of the braille reference card corresponds to a button layout of the remote control,
        the at least one braille embossed character set is one of adjacent to the surface projection or on the surface projection,
        the at least one braille embossed character set indicates a functionality of the button on the remote control that corresponds to the position of the surface projection,
        a surface area of the base is larger than a surface area of the button layout of the remote control such that at least one region of the plurality of regions accommodates at least two braille embossed character sets of the plurality of braille embossed character sets, and
        the at least one region corresponds to a multi-function button on the remote control.

2. The braille reference card according to claim 1, wherein the surface projection is a dummy button having an appearance similar to the button on the remote control.

3. The braille reference card according to claim 1, wherein the at least one braille embossed character set is printed on an adhesive member that is releasably adhered to the base one of adjacent to the surface projection or on the surface projection.

4. The braille reference card according to claim 1, wherein the at least one braille embossed character set is printed on the base one of adjacent to the surface projection or on the surface projection.

5. The braille reference card according to claim 1, wherein
    the at least two braille embossed character sets in the at least one region comprises a first braille embossed character set and a second braille embossed character set, and
    the first braille embossed character set is disposed at a first height from the base different from a second height of the second braille embossed character set from the base.

6. The braille reference card according to claim 1, wherein
    each region of the plurality of regions comprises text adjacent to the surface projection, and
    the text indicates the functionality of the button on the remote control that corresponds to the position of the surface projection.

7. A braille kit for a customized remote-control layout, the braille kit comprising:
    a first base sheet comprising an adhesive release liner surface;
    a plurality of braille embossed members corresponding to a plurality of buttons of a universal remote control, wherein
        the plurality of braille embossed members is releasably adhered to the adhesive release liner surface of the first base sheet,
        each braille embossed member of the plurality of braille embossed members comprises a first surface that includes a brailed embossed character set and a second surface that includes an adhesive material,
        the second surface is opposite to the first surface, and
        the brailed embossed character set indicates a function corresponding to a button of the plurality of buttons of the universal remote control; and
    a second base sheet comprising an adhesive retaining surface, wherein
        each of the plurality of braille embossed members is transferable from the first base sheet to the second base sheet to generate the customized remote-control layout based on a button layout of the universal remote control, and
        the customized remote-control layout corresponds to a subset of the plurality of buttons of the universal remote control.

8. The braille kit according to claim 7, wherein
    the plurality of braille embossed members is adhered to the adhesive retaining surface of the second base sheet to generate the customized remote-control layout,
    a position of each braille embossed member of the plurality of braille embossed members adhered on the second base sheet corresponds to a position of a respective button of the plurality of buttons on the universal remote control, and
    the customized remote-control layout serves as a braille reference card for the universal remote control.

9. The braille kit according to claim 7, further comprising a plurality of dummy button members having an adhesive surface, wherein
    the plurality of dummy button members is similar in appearance to the plurality of buttons of the universal remote control, the plurality of dummy button members is releasably adhered to the adhesive release liner surface of the first base sheet, and each of the plurality of dummy button members is transferable from the first base sheet to the second base sheet to generate the customized remote-control layout.

10. The braille kit according to claim 7, wherein a surface area of the second base sheet is larger than a surface area of the universal remote control such that at least one region of the second base sheet, that corresponds to a position of the button on the universal remote control, accommodates at least two braille embossed members of the plurality of braille embossed members, and the at least one region corresponds to a multi-function button on the universal remote control.

11. A system, comprising:

a server configured to:

generate a user interface to receive at least one user input, wherein the at least one user input is indicative of at least one of a model number associated with an electronic device, a button layout of a remote control associated with the electronic device, or a custom layout having a subset of buttons of the button layout of the remote control; and receive a request to generate a braille reference card corresponding to one of the button layout of the remote control associated with the electronic device or the custom layout; and a user device associated with a user of the electronic device, wherein the user device comprises a display screen configured to display the user interface, the braille reference card comprises a base that includes a plurality of regions, each region of the plurality of regions includes at least one of a surface projection or at least one braille embossed character set, a position of the surface projection corresponds to a position of a button on the remote control such that a layout of the braille reference card corresponds to the button layout of the remote control, the at least one braille embossed character set is one of adjacent to or on the surface projection, and the at least one braille embossed character set indicates a functionality of the button on the remote control that corresponds to the position of the surface projection.

12. The system according to claim 11, wherein the at least one user input indicative of one of the button layout or the custom layout comprises an image of the button layout of the remote control, and the user interface comprises a user interface element configured to edit the image of the button layout to one of add or remove one or more buttons in the image of the button layout.

13. The system according to claim 11, wherein the user interface comprises a dropdown menu to select the model number associated with the electronic device as the user input.

14. The system according to claim 11, wherein the at least one user input indicates whether a surface area of the base is larger than a surface area of the remote control associated with the electronic device.

15. The system according to claim 11, wherein the server is associated with one of a manufacturer or a distributor of the electronic device.

* * * * *